Oct. 6, 1925.
D. E. CODY
1,556,081
LIGHT SHIELD
Filed April 15, 1924
2 Sheets—Sheet 1
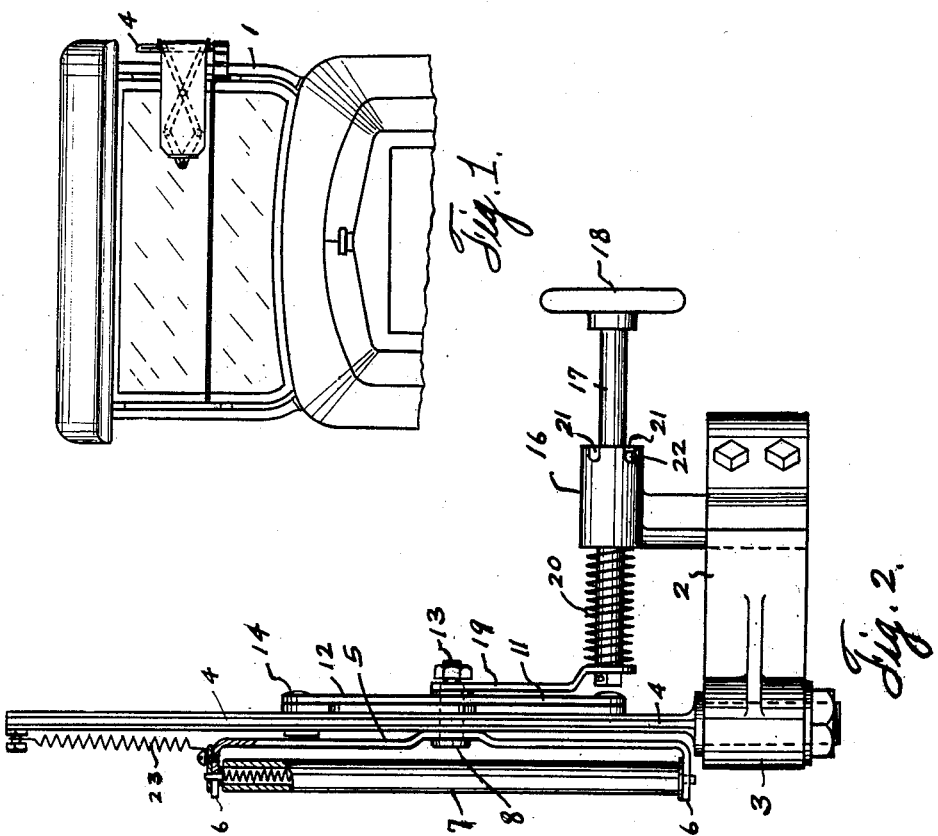

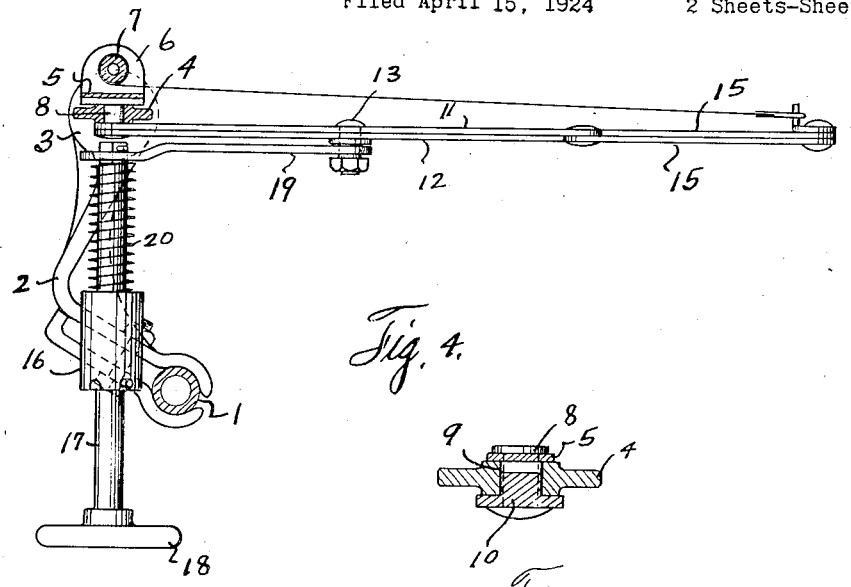
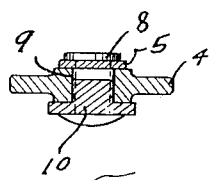
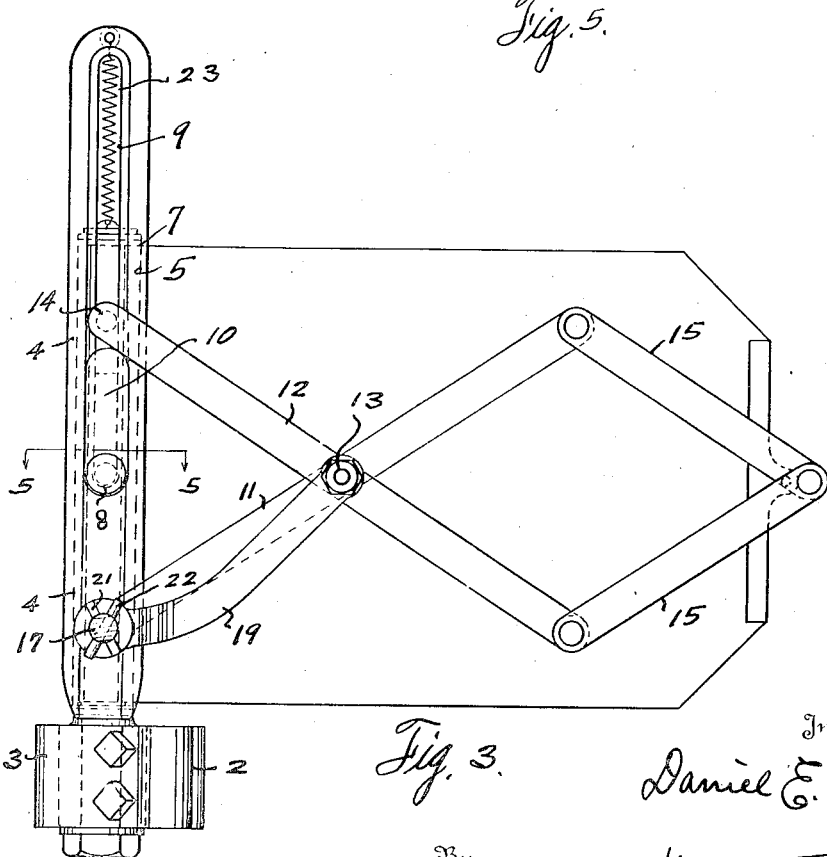

Patented Oct. 6, 1925.

1,556,081

UNITED STATES PATENT OFFICE.

DANIEL E. CODY, OF LEAGUE CITY, TEXAS.

LIGHT SHIELD.

Application filed April 15, 1924. Serial No. 706,678.

*To all whom it may concern:*

Be it known that I, DANIEL E. CODY, a citizen of the United States, residing at League City, in the county of Galveston and State of Texas, have invented certain new and useful Improvements in a Light Shield, of which the following is a specification.

This invention relates to new and useful improvements in a light shield.

One object of the invention resides in the provision of a shield of the character described specially designed to be attached to the windshield frame of a motor vehicle, and of such construction that it may be employed for shielding the eyes of the driver from the glare of the sun's rays or of approaching head lights and at the same time not completely obstruct the view of the road ahead.

Another object of the invention is to provide a shield of the character described which may be readily extended into active position or collapsed and withdrawn out of the way.

With the above and other objects in view, this invention has particular relation to certain novel features of construction, operation, and arrangement of parts, an example of which is given in this specification and illustrated in the accompanying drawings, wherein:—

Figure 1 shows a fragmentary front elevation of a motor vehicle, with the shield applied thereto.

Figure 2 shows a side view of the shield, partly in section.

Figure 3 shows a rear view of the shield in extended position.

Figure 4 shows a plan view partly in section; and,

Figure 5 shows a cross sectional view taken on the line 5—5 of Figure 4.

In the drawings the numeral 1 designates the side member of the wind shield frame, and clamped to this side member there is a bracket 2. The forward end of this bracket is formed with a bearing 3 in which the lower end of the supporting bar 4 is clamped. On the front side of the bar 4 there is a roller bracket 5 having outwardly turned lugs 6, 6, forming bearings for the spring shade roller 7, of conventional construction. The roller bracket 5 has a central bearing pin 8 which runs in a vertical slot 9, in the upper end of the bar 4, and is secured against detachment from the slot by means of the stop 10, which also runs in said slot, and to which the end of the pin 8, opposite the bracket 5 is riveted. Cross links 11, 12, are pivoted together, at their centers, by a pin, as 13, and the former is pivoted at one end to the lower end of the bar 4, and the corresponding end of the latter has a bearing pin 14 which runs in the slot 9. Toggle levers 15, 15, are pivoted together, at one end, and are pivoted at their other ends to the other ends of said links 11 and 12. The shade, wound on the roller 7, has its free end connected to the pivot connecting the outer ends of said toggle levers. The bracket 2 has an upstanding bearing member 16, through which the actuating rod 17 slides. The rear end of this rod has a hand wheel or grip, as 18, and fastened to the forward end thereof there is an arm 19 whose free end has a bearing on the pin 13. Between the bearing 16, and the arm 19, and surrounding the rod 17 there is a coil spring 20. The outer end of the bearing 16 has the spaced notches 21, 21, and the rod 17 has a cross pin, or key 22, adapted to seat in one or the other of said notches. In order to extend the shield, the rod 17 is pulled rearwardly to unseat the key 22 and then turned so as to extend the links 11, 12, and the levers 15, through the arm 19, and the rod 17, is then released to permit the key 22 to seat in the aligned notch 21 to lock the shield in extended position. In order to collapse, or withdraw the shield, the rod is again released and turned to swing the arm 19 into vertical position, thus folding together the links and levers 11, 12 and 15. During this operation the roller 7 is moved upwardly on the supporting bar 4, by the pull spring 23, by which it is supported. This is necessary, inasmuch as the support for the free end of the curtain rises as it collapses. As the shield is again extended, the bearing pin 14 will contact against the stop 10, and operate to gradually lower the curtain roller as the curtain, or shield, is extended.

The shield will usually be fastened on the driver's side of the vehicle, and will extend forwardly at approximately a forty-five degree angle, so as to shield the eyes of the driver from rays of light in front, but at the same time will not cut off the view of the road.

The shield may be easily extended, when needed, and as readily withdrawn when not in use.

What I claim is:—

1. A light shield including a bracket, a supporting bar upstanding therefrom, a bracket attached to said bar, a curtain roller mounted on said last named bracket, a curtain wound on said roller, an extensible frame mounted on said bar, and supporting the free end of the curtain, manual means for extending and collapsing said frame, and means for locking said manual means to hold the frame in either position, said means including a slidably mounted rotatable rod and an actuating arm attached to the rod.

2. A light shield including an anchor, a support carried thereby, an extensible frame attached to said support, a flexible shield attached to the support, and to the frame, means for extending and collapsing said frame and shield horizontally, and means for locking the frame in either position, said means including a slidably rotating rod and a rigid arm attached to said rod and connected to the frame.

3. A light shield including an anchor, a support carried thereby, a shade roller bracket mounted on said support, a shade wound on said roller, an extensible frame carried by the support, and attached to the shade, said frame and shade roller bracket being bodily movable lengthwise relative to the support, manual means for extending and collapsing the frame to extend and withdraw said shade, and means for locking said manual means for holding frame in either extended or collapsed position.

In testimony whereof I have signed my name to this specification.

DANIEL E. CODY.